Feb. 13, 1951 R. J. INGHAM, JR 2,541,256
PRESSURE COOKER GAUGE
Filed Jan. 22, 1946
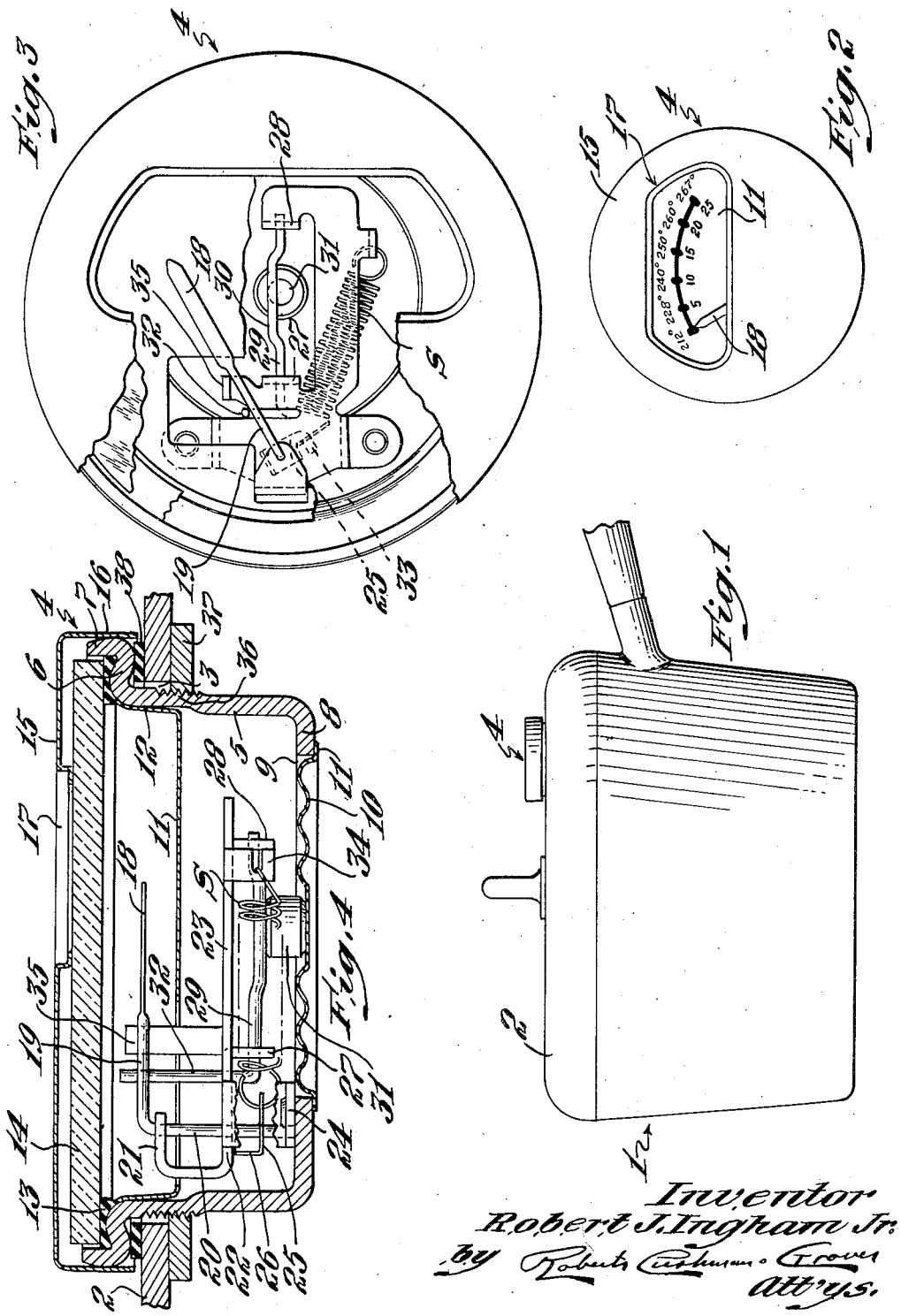
Inventor
Robert J. Ingham Jr.
by Roberts Cushman Grover
Att'ys.

Patented Feb. 13, 1951

2,541,256

UNITED STATES PATENT OFFICE 2,541,256

PRESSURE COOKER GAUGE

Robert J. Ingham, Jr., Fairfield, Conn., assignor to Manning, Maxwell & Moore, Incorporated, New York, N. Y., a corporation of New Jersey Application January 22, 1946, Serial No. 642,721

11 Claims. (Cl. 73—393)

This invention relates to pressure cookers equipped with pressure-responsive gauges, and more particularly to a gauge of diaphragm type designed for use on a pressure cooker.

Pressure cookers are equipped with gauges to enable the user to process food at a desired pressure (or corresponding temperature). Heretofore it has been usual to employ a Bourdon tube gauge. However, for this particular use, such a gauge has certain disadvantages, among them the small size of the opening which leads to the Bourdon tube, and which tends to become plugged with the cooking material and which is difficult to clean, thus resulting in faulty operation of the gauge and an unsanitary condition; the substantial height of such a gauge above the top of the cooker cover so that in some cases, at least, it projects above any other part of the cooker, adding unnecessarily to the height of the latter, and being subject to mechanical injury; the Bourdon gauge is easily injured when subjected to shocks, so that it no longer reads accurately; usually the interior of the gauge case is accessible to the entrance of fluids from the cooker and when, as is sometimes necessary in carrying out certain methods of food preparation, the entire cooker must be immersed in cold water so as suddenly to stop the cooking, the resulting low pressure within the gauge case may suck in water or other fluid which remains within the case and interferes with the proper operation of the gauge; if the gauge case be sealed to prevent such entry of fluid, then the body of air within the case is subject to contraction and expansion in response to temperature changes which may cause an error in reading; and furthermore, the usual cooker gauge is responsive to barometric changes so that when the cooker is used at a high altitude, a correction must be made in the reading of the instrument in order to insure the desired cooking temperature.

The present invention has as objects the provision of a pressure-responsive gauge (which may be graduated to indicate pressures, temperatures or both) which, while of broader utility, is particularly designed for use on pressure cookers, and so constructed as to avoid the above-named defects and deficiencies in gauges such as have previously been employed for this purpose; to provide a gauge which projects but little above the cover of the cooker to which it is applied; to provide a gauge which may readily be oriented with reference to the cover, thereby to permit it to be read right-side-up from any desired direction; to provide a gauge whose indications are accurate and do not require correction regardless of barometric pressure and whose readings are not substantially affected by temperature changes; to provide a gauge having a case which is sealed against the entry of fluid or solid material from the cooking vessel and whose surface, exposed within the cooking vessel, may readily be cleaned; and to provide a gauge of simple and inexpensive construction but of durable and reliable character. Other and further objects and advantages of the invention will be pointed out in the following more detailed description, and by reference to the accompanying drawings wherein Fig. 1 is a diagrammatic side elevation of a pressure cooker having the gauge of the present invention mounted on the cover of the cooker;

Figure 2 is a plan view of the gauge, showing the pointer and dial;

Fig. 3 is a plan view, to larger scale than Fig. 2, with parts of the case and dial broken away to show the interior construction; and Fig. 4 is a vertical diametrical section through the gauge, showing the latter mounted in an aperture in the cooker wall.

Referring to the drawings, the numeral I designates a domestic pressure cooker, here shown as of the saucepan type, having the cover 2, the latter being provided with an aperture 3 (Fig. 4) for the reception of the pressure gauge 4. While as here illustrated, the pressure gauge is set into an aperture in the cover of the cooker, it is contemplated that it may be set into some other part of the cooker wall if desired.

As here illustrated, the gauge comprises a case which may, for example, be made of heavy sheet metal, having the substantially cylindrical body portion 5 of an external diameter such that it may pass freely through the aperture 3 in the wall of the cooker, the upper part of the case being shaped to provide the outwardly directed more or less horizontal shoulder 6 whose outer margin merges with an upwardly directed substantially cylindrical flange 7.

The bottom of the gauge case comprises a horizontal, rigid annular rim 8 defining an opening 9 which is closed by a flexible, pressure-responsive diaphragm 10, here shown as having a marginal flange 11, which underlies the rigid rim 8 of the case, and which is secured leak-tight to the rim 8, for instance by solder, brazing or the like.

The casing houses a graduated dial 11, which may, for example, be of sheet metal and which, as here illustrated, has a marginal, substantially cylindrical upwardly directed supporting flange 12, whose upper edge flares outwardly to bear against the curve of the shoulder 6 of the case. A packing gasket 13 rests upon the shoulder 6 and forms a support for the marginal portion of a strong, substantially rigid, transparent panel 14, of glass or other suitable material. This glass panel is protected by a cover cap 15 which may be of pressed sheet metal or the like, and which has a downwardly directed cylindrical marginal flange 16 which fits over the upwardly directed flange 7 of the casing, and which is secured to the casing, for example by a press fit, or other suitable connecting means, preferably such as to permit removal of the cap, if desired. This cap has a sight opening 17 through which the dial 11 may be observed, the dial being graduated in accordance with the use to which the gauge is to be put, for example, to indicate pounds pressure or corresponding temperatures of saturated steam, or both, as desired.

Within the case and between the dial 11 and the inner surface of the transparent panel 14, there is arranged an index or pointer 18 which, as illustrated, is integral with a horizontally arranged arm 19 fixed to the upper end of a rocking staff 20 (Fig. 4). As illustrated, the arm 19 is integral with the staff 20, although it may be a separate part and suitably united to the part 20, if preferred. The staff 20 turns in aligned bearings in vertically spaced parts 21 and 22, of a bracket member 23, disposed within the case below the dial, and which may be made of sheet metal or other suitable material. This bracket has a foot 24 which is secured to the bottom of the case, for example by rivets, solder, or the like. A metal plate 25 is secured to the staff 20 between the foot 24 and the bearing member 22. The plate 25 is preferably provided with an aperture for the passage of the staff 20 and is fixed to the latter by solder, brazing or the like. This plate 25 has an upwardly directed arm 26 which engages the lower surface of the bearing member 22, so as to prevent upward movement of the staff 20. The lower end of the staff 20 turns in a step bearing in the foot 24 of the bracket.

The bracket 23 has horizontally spaced downwardly directed lugs 27 and 28 (Figs. 3 and 4), having aligned bearing openings for a crank shaft 29. This crank shaft has an offset crank portion 30 intermediate its ends, which overlies a rigid motion-transmitting button 31, secured to the central part of the diaphragm 10. At its left-hand end, as viewed in Figs. 3 and 4, the crank shaft 29 has an upwardly directed arm 32 which normally bears against the side of the index-carrying arm 19.

The plate 25 has a hooked end 33 (Fig. 3) to which one end of a tension spring S is secured. The opposite end of this spring S is attached to a hook member 34 (Fig. 4) extending downwardly from the bracket 23. The spring is so arranged as to tend to swing the index 18 in a counterclockwise direction, its movement in that direction being limited by a rigid stop post 35 projecting upwardly from the bracket 23.

The cylindrical portion 5 of the casing is externally screw threaded below the shoulder 6, and is designed to be engaged by a clamping nut 37.

In assembling the gauge with the cooker, an annular packing gasket 38, for example of rubber, is first placed upon the outer surface of the cooker wall bordering the opening 3, and the cylindrical body portion 5 of the gauge case is passed through the gasket 38 and through the aperture in the cooker wall, and then the nut 37 is engaged with the screw threads at 36 and tightened so as to draw the shoulder 6 down toward the outer surface of the cooker wall, thereby compressing the gasket 38 and forming a leak-tight joint between the gauge case and the cooker wall. Before the nut 37 is fully tightened, the gauge case may be oriented with respect to the cooker wall, so that the dial graduations may be read from any desired direction relatively to the cooker. As illustrated, the dial lies in a plane perpendicular to the axis of the aperture 3, and below the plane of the inner surface of the cover 2, the gauge mechanism thus being all within the cooker, so that that part of the gauge case which is exposed above the cooker cover may be shallow and does not add unduly to the height of the cooker. For instance, the top of the cap 15 need not be more than one-fourth inch above the adjacent surface of the cooker cover.

After the gauge parts have been assembled and the transparent panel 14 put in place and sealed, the interior of the gauge case is highly evacuated, thus leaving the diaphragm 10 subject substantially to external variations in pressure alone. After thus evacuating the gauge case, changes in temperature have very little effect on the operation of the gauge, since there is insufficient air within the case to cause substantial variations in internal pressure due to temperature changes. By the evacuation of the case, atmospheric pressure holds the panel 14 firmly against the gasket 13 so that a leak-tight joint is insured. As above noted, the cap 15 protects the glass, and also provides a good external appearance, but is not relied upon to hold the glass in place.

The gauge is calibrated with respect to normal sea-level atmospheric pressure and as it is sealed against the entrance or escape of air, changes in altitude at which the gauge may be used have no substantial effect upon the accuracy of its reading as applied to a pressure cooker. When the gauge is moved to an altitude higher than sea level, the pointer tends to indicate a minus value. Thus when applied to a cooker, the true gauge pressure within the cooker at an altitude above sea level, is not shown by the gauge reading. For example, at an altitude of 4000 feet, the gauge would indicate a pressure two pounds less than that indicated by a master gauge at this altitude. Thus when used on a pressure cooker, at an altitude of 4000 feet, it will actually take seventeen pounds pressure within the cooker to make the gauge indicate fifteen pounds. Under these conditions the boiling point of water, when the gauge then indicates fifteen pounds, will be exactly the same as the boiling point of water at sea level. The user therefore does not have to refer to any reference tables to correct the reading of the gauge for altitude, so that if a certain cooking process should be carried out at an actual pressure of fifteen pounds (sea level) to insure the proper temperature, the user of this pressure cooker, equipped with the novel gauge, may be assured that a corresponding temperature will obtain within the cooker whenever the gauge reads fifteen pounds. Thus it is possible, if desired, to mark the dial with a temperature scale in addition to or in place of the pressure scale, with the assurance that when used on a cooker the readings will be correct at any elevation.

Since the diaphragm is substantially flat or slightly ribbed, and imperforate, and the exposed surface of the case within the cooker is smooth, it is easy to keep the gauge clean and free from food residues; and as the case is sealed, no moisture from the cooker can gain entrance.

While one desirable embodiment of the invention has been illustrated by way of example, it is to be understood that the invention is broadly inclusive of any and all embodiments falling within the scope of the appended claims.

I claim:

1. In combination with a pressure vessel having an aperture in its wall for the reception of a pressure gauge, a pressure gauge having a case designed to fit in said aperture, the case housing a dial and a movable pointer, the case having a transparent panel overlying the dial, and means making a leak-tight joint between the transparent panel and the case, the dial being disposed in a plane parallel to the inner surface of the wall of the pressure vessel bordering the aperture, the case having a bottom comprising a flexible pressure-responsive diaphragm, means for transmitting motion from the diaphragm to the pointer, the case being air-tight and its interior being evacuated, and means for clamping the case to the vessel wall.

2. A pressure gauge for use with a pressure vessel, the gauge being of the kind having a case which houses a graduated dial, and index means cooperable therewith, the case having an annular interior shoulder in a plane above that of the dial, a packing gasket on said shoulder, a transparent panel having its marginal portion resting on said gasket, a cap having a pressure fit with the case and which protects the transparent panel, the cap having a sight opening through which the index means may be observed, the bottom of the case comprising a flexible diaphragm, means for transmitting motion from the diaphragm to the index means, the case being leak-tight and the interior of the casing being evacuated, the case being designed to fit within an aperture in the wall of the pressure vessel with its annular shoulder overlying the wall bordering the aperture, and means operative to clamp the case to the pressure vessel wall.

3. A pressure gauge for use with a pressure cooker, the gauge being of the kind having a case which houses a graduated dial, and index means cooperable therewith, the case being of unitary construction, having a cylindrical body portion provided with an annular internal shoulder in a plane above that of the dial and which merges with an upwardly directed cylindrical flange, a packing gasket on said shoulder, a rigid transparent panel having its marginal portion resting on said gasket and with its edge inside of said cylindrical flange, the bottom of the case consisting of a substantially flat annular rim defining a central aperture, a flexible pressure-responsive diaphragm spanning said aperture and having its edges secured leaktight to said annular rim, the entire interior of the case being highly evacuated whereby atmospheric pressure is effective to hold the transparent panel in leaktight assembly with the case.

4. A pressure gauge for use with a pressure vessel having an aperture in its wall, said gauge having a case which houses a dial and a pointer, the upper portion of the case having an outwardly directed annular shoulder whose outer margin merges with an upwardly directed substantially cylindrical flange, the dial being supported by the shoulder, a transparent panel resting on the shoulder, a retaining cap overlying the transparent panel and having a portion which is secured to said cylindrical flange of the case, the cap having a sight opening through which the pointer may be observed, the bottom of the case comprising a flexible pressure-responsive diaphragm, means within the case for transmitting motion from the diaphragm to the pointer, the case being externally screw threaded intermediate its bottom and said shoulder, a nut engaging the externally screw-threaded portion of the case and which is operative to clamp the shoulder against the wall of a pressure vessel bordering the aperture, the case being leak-tight and internally evacuated.

5. A pressure gauge for use with a pressure vessel having an aperture in its wall, said gauge comprising a unitary case closed leaktight at its top by a rigid transparent panel, a movable pointer housed within the case, the bottom of the case comprising a flexible pressure-responsive diaphragm, mechanical motion transmitting means within the case for transmitting motion from the diaphragm to the pointer, the interior of the case being highly evacuated so that the transparent panel is held in leaktight assembly with the case by the pressure of the ambient atmosphere, and means operative to fix the case leaktight within the aperture in the vessel wall with the dial substantially parallel to the plane of the aperture.

6. A pressure gauge for use with a pressure vessel having an aperture in its wall, the gauge comprising a unitary case, closed leaktight at its top by a rigid transparent panel and housing a movable pointer, the bottom of the case consisting of an annular rim substantially parallel to the dial and defining a central aperture, a pressure-responsive diaphragm having its edge secured leaktight to said rim, mechanical means within the case for transmitting motion from the diaphragm to the pointer, the interior of the case being highly evacuated so that the transparent panel is held in leaktight assembly with the case by the pressure of the ambient atmosphere, and means operative to fix the case leak-tight within the aperture in the cooker wall.

7. A pressure gauge having a unitary case providing a single chamber within which there is arranged index means, a rigid transparent panel closing said chamber at its top, a portion of the wall of the case being constituted by a flexible, pressure-responsive diaphragm, and mechanical means within said chamber for transmitting motion from the diaphragm to the index means, the index means being calibrated with reference to normal sea-level atmospheric pressure, said chamber being highly evacuated whereby the transparent panel is held in leaktight assembly with the case by atmospheric pressure.

8. A pressure vessel having in combination therewith a pressure gauge mounted thereon, said gauge comprising a unitary case defining a single chamber within which there is located index means, a rigid transparent panel forming the top of said chamber, a portion of the exterior wall of said case being constituted by a flexible pressure-responsive diaphragm, mechanical means within the chamber for transmitting motion from the diaphragm to said index means, the entire interior of the case being evacuated so highly that the transparent panel is held in leaktight assembly with the case by atmospheric pressure, the index means being calibrated so that any given index reading always corresponds to the same vessel temperature, regardless of the altitude at which the vessel may be used.

9. In combination with a pressure cooker comprising a case having a substantially cylindrical body portion permanently closed at its bottom by a flexible diaphragm and closed at its top by a removable transparent panel, index means within the case and means within the case for transmitting motion from the diaphragm to the index means, a sealing gasket between the transparent panel and the case, the case being highly evacuated whereby the panel is held in assembled relation to the assembled case by the pressure of the ambient atmosphere, the index means being calibrated at sea level whereby any given reading of the index means always corresponds to the same cooker temperature regardless of the barometric pressure.

10. A pressure gauge comprising a casing having a single interior chamber which is closed at its top by a transparent panel held in leaktight assembly with the case by external atmospheric pressure, index means within said chamber and visible through said panel, a pressure-responsive diaphragm forming an exterior wall of said casing and mechanical means within said chamber for transmitting movement from said diaphragm to the index means, the casing being sealed thereby to prevent the entry of liquid, gas or solids, the interior of the casing being evacuated thereby to prevent changes in ambient temperature from substantially affecting the accuracy of the gauge.

11. A pressure gauge comprising a casing one exterior wall of which is constituted by a rigid transparent panel whose inner surface bears against an annular seat, index means and a graduated dial within the casing and visible through said panel, a pressure-responsive diaphragm forming one wall of said chamber and which is freely exposed at its outer side to atmospheric pressure, and mechanical means within the casing for transmitting motion from said diaphragm to the index means, the interior of the casing being evacuated whereby atmospheric pressure holds the panel leak-tight against said seat so as to provide a fluid-tight joint between the panel and seat, the evacuation of the casing preventing ambient temperature changes from substantially affecting the index readings.

ROBERT J. INGHAM, Jr.

REFERENCES CITED

The following references are of record in the file of this patent:

UNITED STATES PATENTS

| Number | Name | Date |
|---|---|---|
| 71,773 | Maloy | Dec. 3, 1867 |
| 452,877 | Knoefler | May 26, 1891 |
| 1,008,566 | Schubert | Nov. 14, 1911 |
| 1,060,812 | Bristol et al. | May 6, 1913 |
| 1,273,987 | Azadian | July 30, 1918 |
| 1,453,255 | Poppert | Apr. 24, 1923 |
| 1,652,761 | Carter | Dec. 13, 1927 |
| 2,086,044 | Nelson | July 6, 1937 |
| 2,309,401 | Kollsman | Jan. 26, 1943 |
| 2,329,039 | Fenwick | Sept. 7, 1943 |